United States Patent [19]

Jordan et al.

[11] Patent Number: 5,685,562

[45] Date of Patent: Nov. 11, 1997

[54] AUTOMOTIVE AIRBAGS CONTAINING ELIMINATORS OF UNDESIRABLE GASES

[75] Inventors: Michael P. Jordan, South Weber; Matthew A. Cox, Bountiful; Alan J. Ward, North Ogden, all of Utah

[73] Assignee: Morton International, Inc., Chicago, Ill.

[21] Appl. No.: 515,842

[22] Filed: Aug. 16, 1995

[51] Int. Cl.⁶ .................. B60R 21/28; B60R 21/16
[52] U.S. Cl. .............. 280/739; 280/743.1; 280/728.1
[58] Field of Search ................ 280/743.1, 728.1, 280/739, 738, 743.2, 729

[56] References Cited

U.S. PATENT DOCUMENTS

| | | | |
|---|---|---|---|
| 3,468,730 | 9/1969 | Gawlick et al. | 149/61 |
| 4,111,458 | 9/1978 | Okada et al. | 280/739 |
| 4,943,086 | 7/1990 | Cunningham | 280/741 |
| 5,035,757 | 7/1991 | Poole | 149/46 |
| 5,084,118 | 1/1992 | Poole | 149/22 |
| 5,160,163 | 11/1992 | Castagner et al. | 280/743.1 |
| 5,193,847 | 3/1993 | Nakayama | 280/743.1 |
| 5,221,109 | 6/1993 | Marchant | 280/736 |
| 5,241,910 | 9/1993 | Cunningham et al. | 102/530 |
| 5,290,060 | 3/1994 | Smith | 280/737 |
| 5,431,103 | 7/1995 | Hock et al. | 102/289 |
| 5,584,507 | 12/1996 | Khandhadia et al. | 280/743.1 |

FOREIGN PATENT DOCUMENTS

| | | | |
|---|---|---|---|
| 5-16752 | 1/1993 | Japan | 280/728.1 |
| 90/15713 | 12/1990 | WIPO | 280/743.1 |

*Primary Examiner*—Peter C. English
*Attorney, Agent, or Firm*—Wayne E. Nacker; Gerald K. White

[57] ABSTRACT

Material, such as catalysts, absorbents, and adsorbents, are disposed within an automotive airbag so as to contact airbag inflation gases passing therethrough and remove undesirable gases therefrom.

14 Claims, 5 Drawing Sheets

FIG. 4
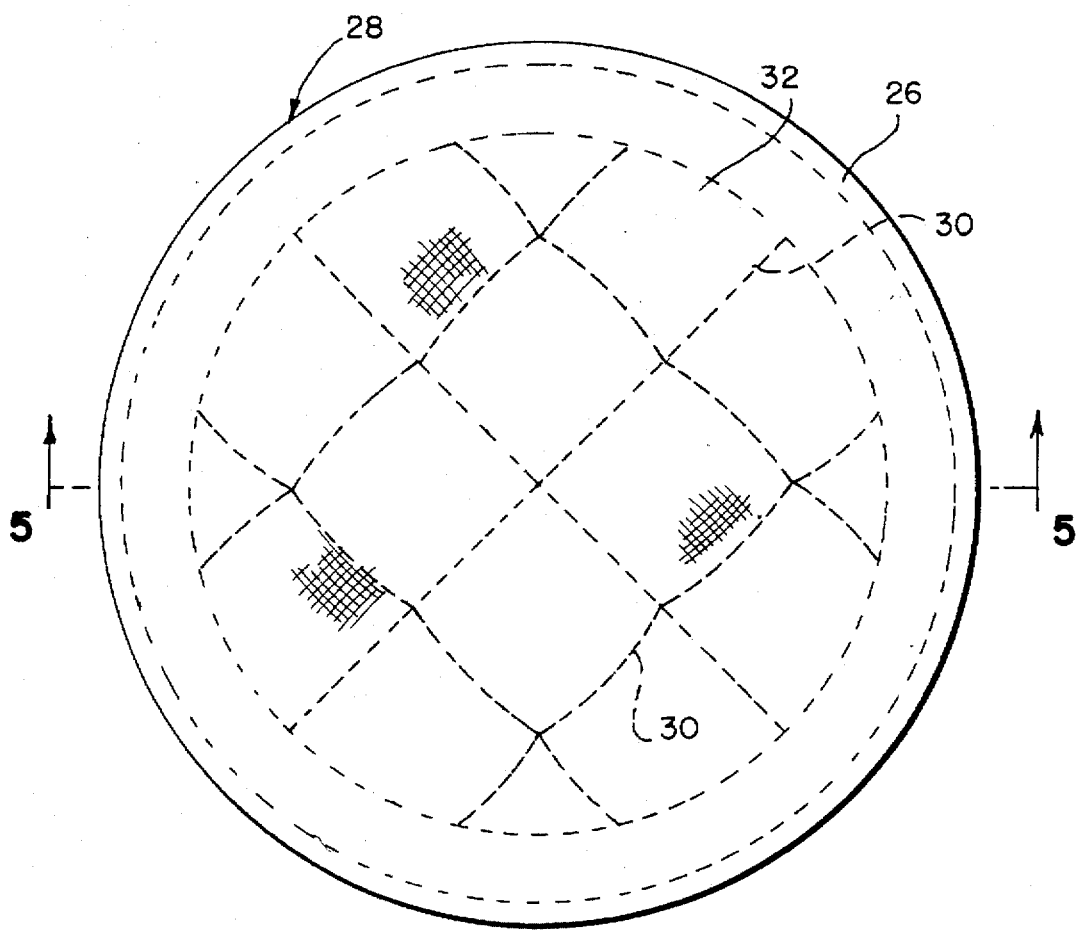
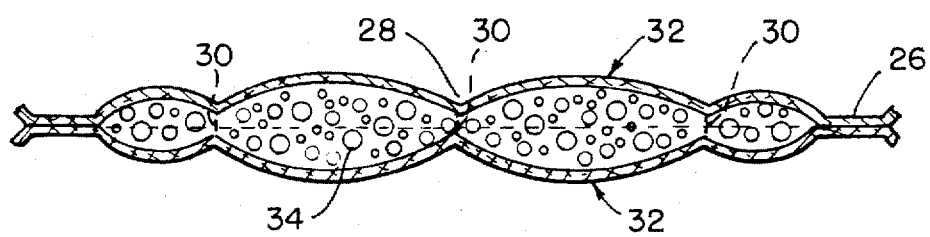
FIG. 5

AUTOMOTIVE AIRBAGS CONTAINING ELIMINATORS OF UNDESIRABLE GASES

BACKGROUND OF THE INVENTION

Most present-day automotive airbag inflators use a gas generant based on sodium azide. This material has the advantage of producing, upon combustion, only nitrogen gas. On the other hand, sodium azide has significant toxicity, presenting disposal problems.

Accordingly, there has been a desire to replace sodium azide with less toxic gas generant compositions. A number of such gas generant compositions have been described, for example in U.S. Pat. Nos. 3,468,780, 5,084,118, and 5,035,757, the teachings of each of which are incorporated herein by reference. Unfortunately, most non-azide gas generant compositions include, in addition to nitrogen, oxygen and/or hydrogen and/or carbon. The combustions of such non-azide gas generant compositions produce large volumes of generally non-toxic gases; however, they also tend to produce small, but significant, levels of undesirable gases, such as $NH_3$, $NO_x$, CO, and HCN, each of which may be problematic in the range of 25 to 1000 ppm. In order to reduce or eliminate possible health effects, it is desirable to decrease the levels of these gases. When an airbag is deployed, it must rapidly inflate, e.g., in the range of between 30 and 100 milliseconds, and then rapidly deflate. During deflation, the gases are vented into the passenger compartment of a vehicle. The occupants of the vehicle may thus be exposed to these undesirable gases. The generation of trace, but nevertheless significant, levels of undesirable gases is an important factor in why non-azide gas generant compositions have not replaced azide formulations to a greater extent.

A typical automotive airbag system consists of an airbag and a pyrotechnic inflator for producing the gases which inflate the airbag. Inflators, are described, for example, in U.S. Pat. Nos. 4,943,086, 5,221,109, and 5,241,910, the teachings of each of which are incorporated herein by reference. In a typical airbag inflator deployment system, a remote sensor senses the force of a collision. The sensor is electrically connected to a squib in the inflator, and electrically generated heat in the squib ignites a small charge of pyrotechnic material in the squib. The pyrotechnic charge, in turn, produces heat that ignites a larger charge of ignitor composition. The heat from the ignitor composition then sets off a much larger charge of gas generant composition that produces a substantial volume of gas for inflating the airbag. It is also understood that there are variations of this typical system to which the present invention is applicable; for example, hybrid inflators which inflate airbags with a combination of pyrotechnic-generated gases and compressed gases, such as that desired in U.S. Pat. No. 5,290,060, the teachings of which are incorporated herein by reference.

SUMMARY OF THE INVENTION

In accordance with the present invention, automotive airbags are provided which contain material(s) for removing undesirable gases that are produced by combustion of a gas generant composition and/or other pyrotechnic compositions in the airbag inflator. The gas-removing material may be a catalyst for a reaction that converts an undesirable gas to innocuous products, an absorbent, or an adsorbent.

BRIEF DESCRIPTION OF THE DRAWINGS

FIG. 4 is an enlarged plan view of the vents and pouches of FIG. 3.

FIG. 5 is a cross-sectional view of the pouches taken along line 5—5 of FIG. 4.

DETAILED DESCRIPTION OF CERTAIN PREFERRED EMBODIMENTS

Figure 1:
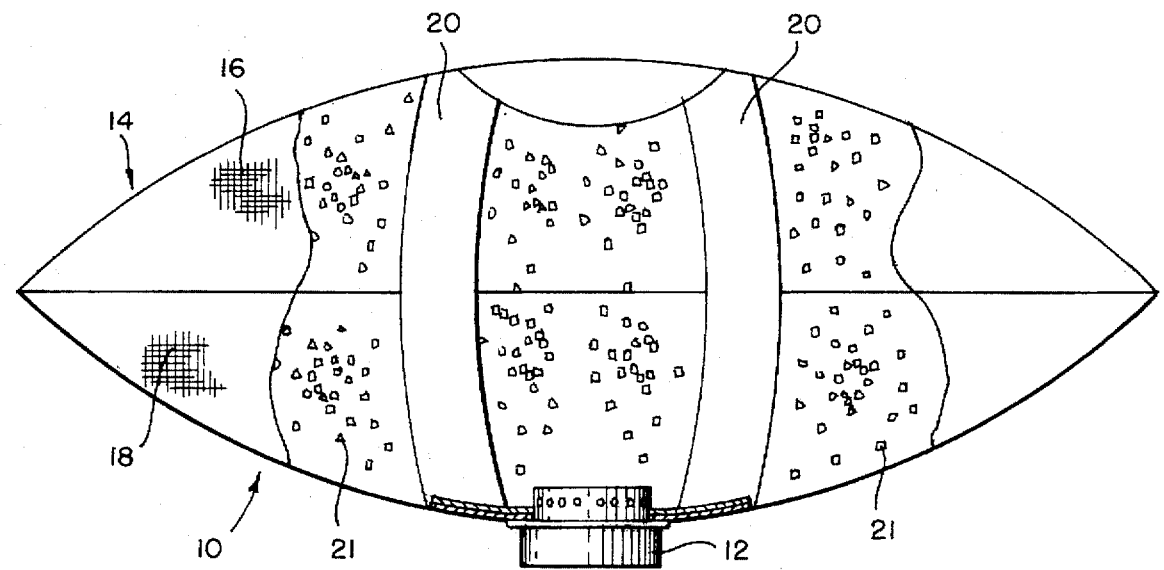
FIG. 1 is a cut-away (diagrammatic) perspective view of an inflated airbag and associated inflation module, the airbag containing material for removing undesirable gases.

As undesirable gases are most problematic with non-azide gas generant compositions, the invention is primarily directed to removing undesirable gases produced by non-azide gas generant compositions. Non-azide gas generant compositions to which the invention is primarily directed are those which contain the combinations of N plus O and/or N plus H, giving rise to $NO_x$ (especially NO and $NO_2$) and $NH_3$ combustion products. Such gas generant compositions commonly also contain carbon atoms, further giving rise to CO and HCN combustion products. However, the invention is applicable to inflators using azide as the gas generant material, as well, because pyrotechnics of the squib and/or ignitor material may produce undesirable gases upon combustion.

It has heretofore been proposed to include undesirable gas-removing materials inside the inflator. However, this approach has not proven to be sufficiently effective. It is likely, that the residence time in the inflator itself is so short that any undesirable gas-removing material does not have time to act effectively. In addition, very high temperatures within the inflator may reduce the effectiveness of such material. Herein, it is discovered that undesirable gas-removing materials are effective when disposed within the airbag itself so as to contact gaseous combustion products as the gases flow through the bag.

The gas-removing material may be a catalyst, an absorbent or an adsorbent. A catalyst is a substance that accelerates or promotes a chemical reaction, in this case, a substance that promotes a reaction that converts undesirable gases to innocuous materials. An adsorbent is a substances that will holds other substances, e.g., undesirable gases, on its surface. An absorbent is a substance which allows molecules, e.g., molecules of undesirable gases, to penetrate its surface and become trapped. Hereinafter, catalysts, absorbents, and adsorbents will be collectively referred to as "gas-eliminators". Mixtures of such gas-eliminators may be desirably employed in the practice of the present invention, the gas-eliminators being selected according to the gas generant composition and the undesirable gases emitted thereby. Some suitable undesirable gas-removing substances include, but are by no means limited to:

Sofnox® K—an absorbent for acidic gases, such as $NO_x$ and CO, sold by Molecular Products, U.K.

Carbon Monoxide Catalyst—catalyzes oxidation of CO with $O_2$ to produce $CO_2$, sold by Molecular Products, U.K.

Ammonia Catalyst—reduces levels of ammonia, sold by Molecular Products, U.K.

Sofnofil®—an adsorbent for $NO_x$ sold by Molecular Products, U.K.

The amount of the undesirable gas-eliminator may vary significantly, depending upon the gas generant material in the inflator and the undesirable gases and relative amounts produced thereby, as well as upon the effectiveness of the eliminator(s) in removing the undesirable gases. Thus, on a weight basis, the undesirable gas-eliminator may typically be present anywhere from about 1 to about 100 wt %, relative to the weight of the gas generant material in the inflator. Even when disposed within the airbag, the gases generated by combustion of the gas generant have a very limited dwell time within the airbag; thus, a significant excess of undesirable gas-eliminator is preferably employed, relative to the amount which would be required to remove undesirable gases from a generally static environment.

FIG. 1 illustrates an inflator/airbag assembly 10, with the inflator 12 represented as a cylindrical container and the airbag 14 shown as inflated. The airbag 14 includes a front fabric 16 and a rear fabric 18 sewn together so as to form an substantially enclosed region. In this airbag design, tethers 20 formed of fabric extend internally from between the front and rear of the airbag to help define the configuration of the airbag during inflation, preventing the front fabric 16 from extending too far forward.

Figure 2:
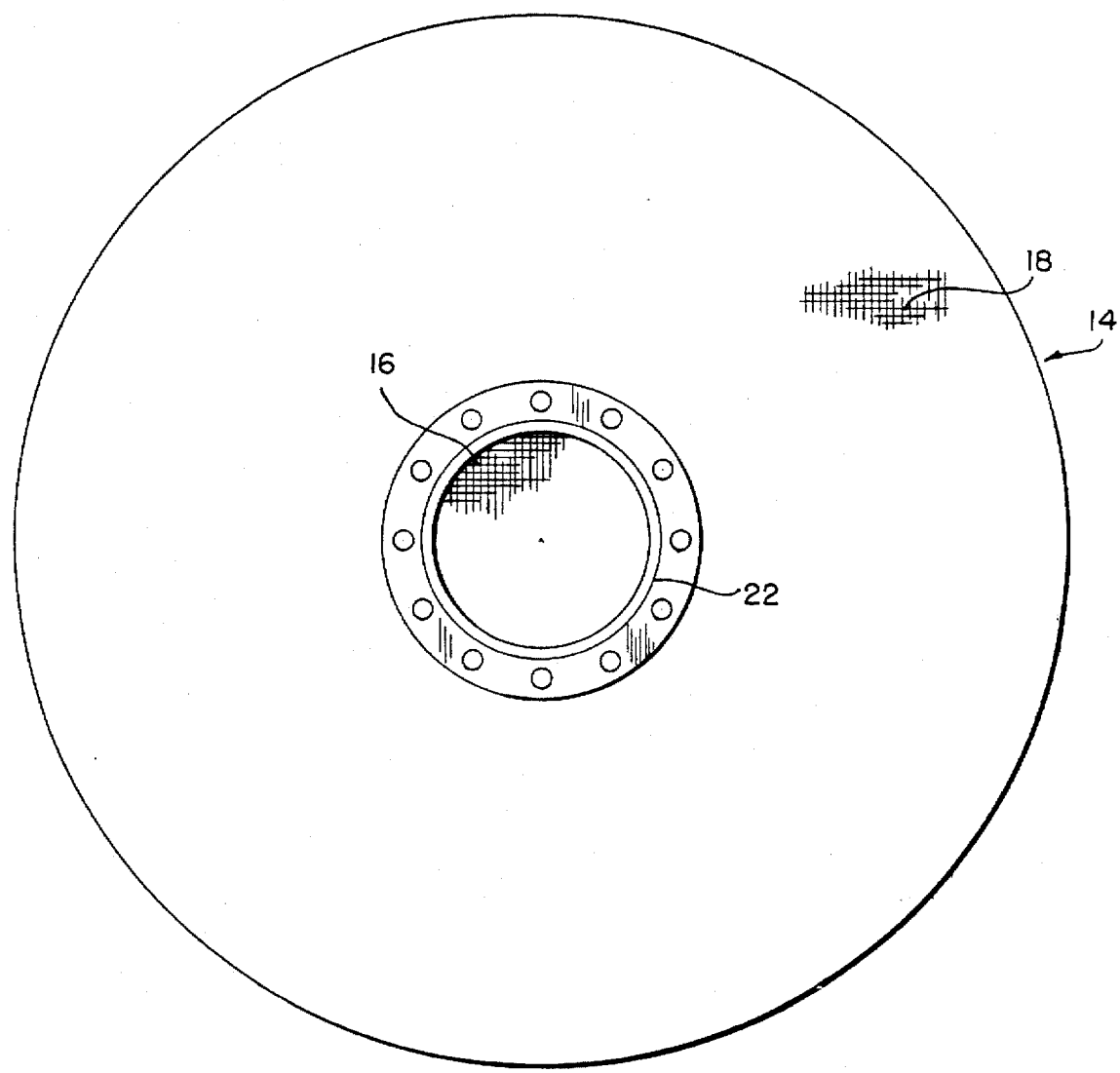
FIG. 2 is a plan view of the rear side of an automotive airbag without vents.

While the airbag 14 must very rapidly inflate, it must also very rapidly deflate. In fact, the airbag 14 is deflating, even as it inflates. Deflation is most typically through the rear of the bag. In FIG. 2 is illustrated a non-vented bag 14. In such an airbag 14, the front fabric 16 is typically treated or woven so as to be substantially gas-impermeable, while the rear fabric 18 is substantially porous and gas-permeable, whereby deflation is through the rear fabric 18. Both fabrics 16, 18 are typically formed of 6/6 nylon; however, the front fabric 16 is typically coated with a material that renders it substantially gas-impermeable or woven so as to be gas-permeable. (Other designs may allow the use of gas-permeable fabric on the front panel of the airbag.) A ring or throat 22, formed of multiple layers of fabric and defining a rear fabric opening, provides for attachment of the airbag 14 to the inflator 12. In such an airbag 14, the undesirable gas-eliminator, illustrated as particulates 21 in FIG. 1, may be merely packed lossely between the front and rear fabric, 16, 18 in powder or granular form. In fact, at the present time, this has proven to be the most effective deployment of gas eliminator. The powder or granules should be sufficiently small so as to provide a large surface area, but preferably are of a size larger than the pores of the porous fabric 16 and/or 18 so as to be retained within the airbag 14. While there is no significant consequences if some of the undesirable gas-eliminator is carried through the fabric 16 and/or 18 by the out-flowing gases, escape of such particulates tends to give the impression of smoke, and is therefore undesirable.

Figure 3:
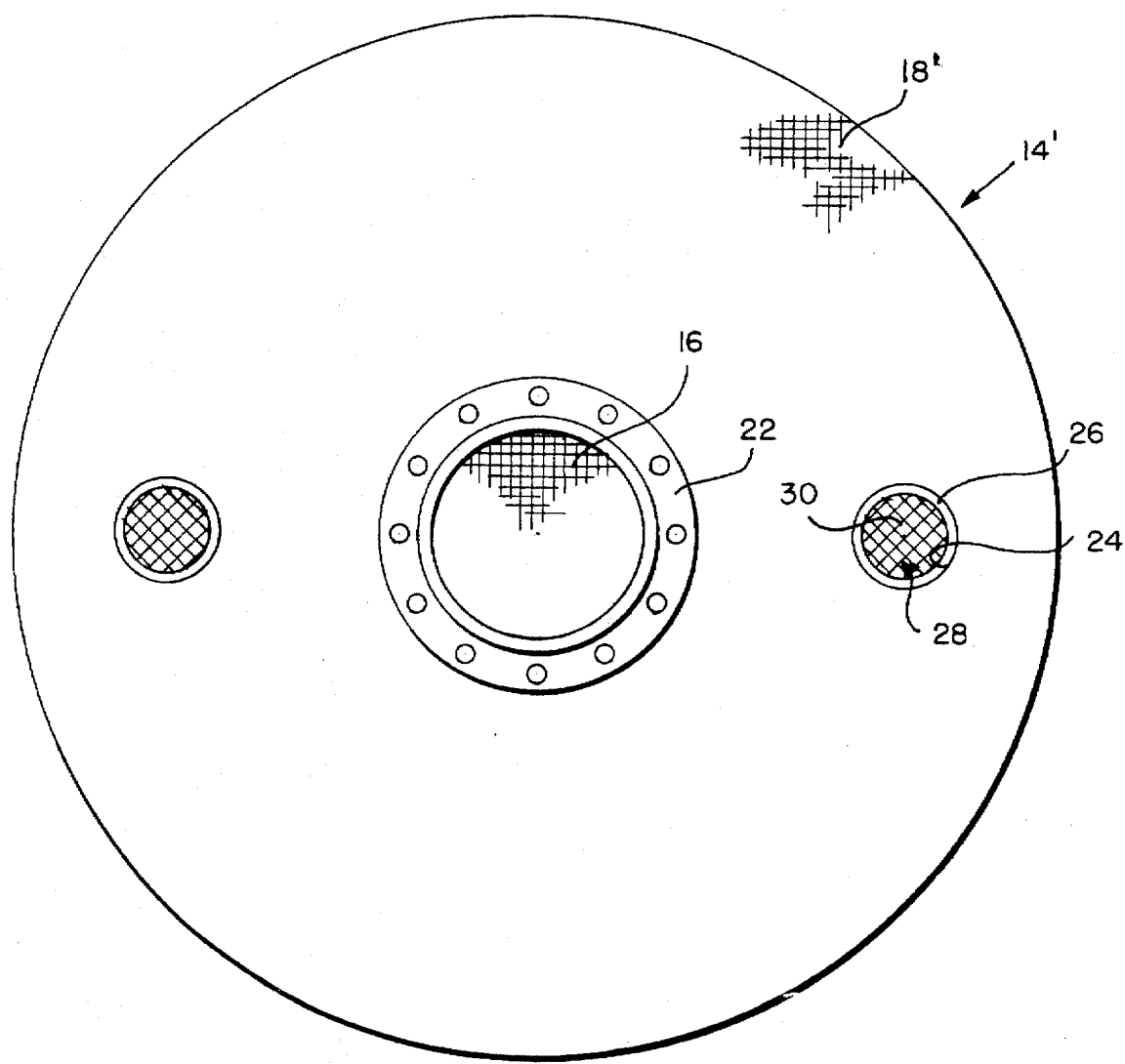
FIG. 3 is a plan view of the rear side of an automotive airbag having vents and pouches within the vents, the pouches containing material for removing undesirable gases.

In the airbag 14' shown in FIG. 3, two vent openings 24 are illustrated, the openings 24 typically having a reinforced fabric area 26. In such an airbag 14', the rear fabric 18' and the front fabric 16 are treated or woven in such a way as to be substantially gas-impermeable. In such an airbag 14', the undesirable gas-eliminator cannot simply be loose between the front fabric 16 and the rear fabric 18', or it would all blow through the vent openings 24, creating a large amount of dust within the passenger compartment. In the illustrated airbag, a pouch 28 is disposed across each vent opening 24 and contains the undesirable gas-eliminator 34, as better seen in FIG. 5. As seen in FIGS. 4 and 5, the pouch 28 is formed of two pieces of porous fabric 32 stitched to the reinforced fabric area 26 around the vent openings 24 and quilted with stitching 30 to maintain an even distribution of the undesirable gas-eliminator. The gases exiting the bag pass through the vent openings 24 where the undesirable gas-eliminator 34 within the pouches 28 removes undesirable gases.

Figure 6:
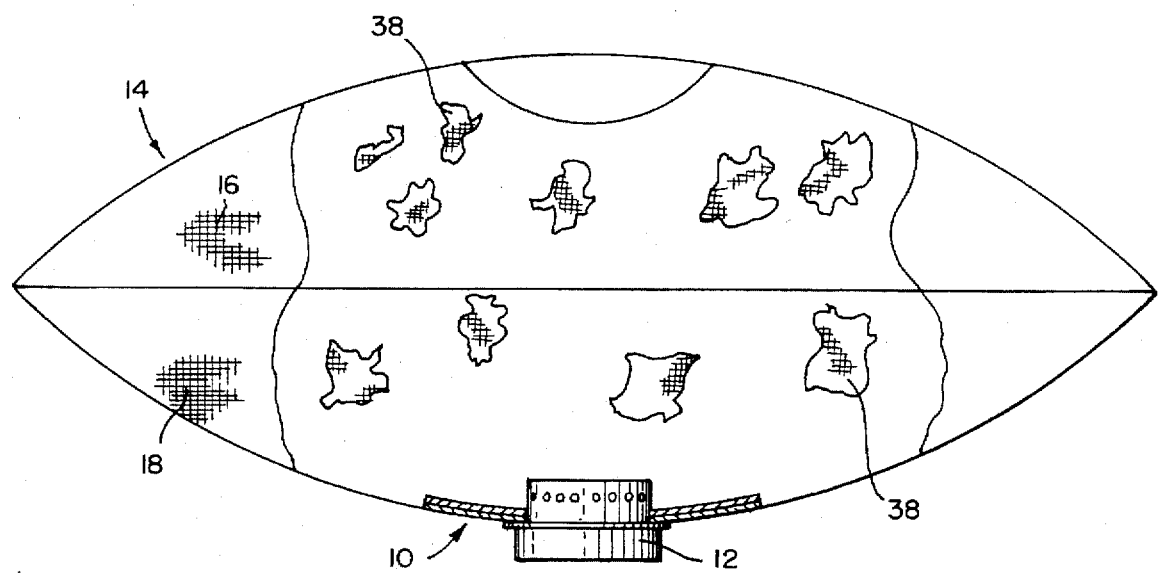
FIG. 6 is a view, similar to FIG. 1, in which the material for removing undesirable gases is impregnated into loose sheets disposed within the airbag.

Another approach is to impregnate airbag fabric which the generant-produced gas will contact during its passage through the airbag. Such fabric may be, for example, the front fabric 16, the rear fabric 18, the fabric used to form the tethers 20, or the multi-layer fabric used to reinforce or protect the rear panel through 22. Even loose sheets of fabric 38, as shown in FIG. 6 disposed within the airbag, (on the order of "dryer sheets" impregnated with fabric softener) may be impregnated with the undesirable gas-eliminator.

The invention will now be described in greater detail by way of specific example.

EXAMPLE

Twelve airbag/inflator assemblies were prepared, each inflator containing 61 grams of a gas generant formula of 5-aminotetrazole, cupric oxide, strontium nitrate and guanidine nitrate, such as described in U.S. patent application Ser. No. 08/207,922 filed 8 Mar. 1994. Three each of the airbags (for triplicate runs) were filled with nothing (control), 30 grams Sofnox®, 30 grams Sofnofil®, and 30 grams Ammonia Catalyst. Undesirable gases, NO, $NO_2$, CO, $NH_3$, and HCN were measured. Results are in the table. Load is gas generant in grams. Undesirable Gas levels are in parts per million (ppm) by weight.

| Inflator No. | Configuration | Load | Cond. Temp. | NO | $NO_2$ | CO | $NH_3$ | HCN |
|---|---|---|---|---|---|---|---|---|
| 1 | Baseline module | 61 | 21° C. | 74.2 | 13.8 | 207.0 | 372.0 | 10.3 |
| 2 | Baseline module | 61 | 21° C. | 84.9 | 13.8 | 189.0 | 348.0 | 10.9 |
| 3 | Baseline module | 61 | 21° C. | 76.6 | 0.0 | 161.0 | 249.0 | 7.1 |
| | | | Average = | 78.6 | 9.2 | 185.7 | 323.0 | 9.4 |
| | | | St Dev = | 5.6 | 8.0 | 23.2 | 65.2 | 2.1 |
| 4 | SOFNOX absorbent in bag | 61 | 21° C. | 33.2 | 0.0 | 71.9 | 121.0 | 1.8 |
| 5 | SOFNOX absorbent in bag | 61 | 21° C. | 92.6 | 0.0 | 192.0 | 265.0 | 5.8 |
| 6 | SOFNOX absorbent in bag | 61 | 21° C. | 88.4 | 0.0 | 191.0 | 251.0 | 6.5 |
| | | | Average = | 71.4 | 0.0 | 151.6 | 212.3 | 4.7 |
| | | | St Dev = | 33.1 | 0.0 | 69.1 | 79.4 | 2.6 |
| | | | % Change = | −9.1 | −100.0 | −18.3 | −34.3 | −9.1 |
| 7 | SOFNOFIL absorbent in bag | 61 | 21° C. | 41.0 | 0.0 | 185.0 | 338.0 | 5.7 |
| 8 | SOFNOFIL absorbent | 61 | 21° C. | 62.8 | 6.9 | 183.0 | 342.0 | 6.7 |

-continued

| Inflator No. | Configuration | Load | Cond. Temp. | NO | NO$_2$ | CO | NH$_3$ | HCN |
|---|---|---|---|---|---|---|---|---|
| 9 | SOFNOFIL absorbent in bag | 61 | 21° C. | 34.8 | 2.3 | 163.0 | 318.0 | 3.0 |
| | Average = | | | 46.2 | 3.1 | 177.0 | 332.7 | 5.1 |
| | St Dev = | | | 14.7 | 3.5 | 12.2 | 12.9 | 1.9 |
| | % Change = | | | −41.2 | −66.7 | −4.7 | 3.0 | −45.6 |
| 10 | NH$_3$ catalyst in bag | 61 | 21° C. | 78.0 | 3.6 | 190.0 | 223.0 | 7.5 |
| 11 | NH$_3$ catalyst in bag | 61 | 21° C. | 74.7 | 1.9 | 187.0 | 201.0 | 6.5 |
| 12 | NH$_3$ catalyst in bag | 61 | 21° C. | 61.3 | 7.0 | 195.0 | 198.0 | 4.3 |
| | Average = | | | 71.3 | 4.2 | 190.7 | 207.3 | 6.1 |
| | St Dev = | | | 8.8 | 2.6 | 4.0 | 13.7 | 1.6 |
| | % Change = | | | −9.2 | −54.7 | 2.7 | −35.8 | −35.2 |

What is claimed is:

1. An automotive airbag having a front fabric and a rear fabric, said rear fabric having an opening for receiving inflation gases therethrough and vent opening through which gases exit to deflate said airbag, said airbag having pouch means for containing material extending across said vent openings, said pouch means containing gas-eliminators for removing undesirable gases from a flow of gases through said airbag.

2. An airbag according to claim 1 wherein said gas-eliminators comprise material selected from the group consisting of catalytic material, absorbent material, and adsorbent material.

3. An airbag according to claim 1 in combination with an inflator containing a gas generant composition.

4. The combination according to claim 3 wherein said gas-eliminators comprise material selected from the group consisting of catalytic material, absorbent material, and adsorbent material.

5. The combination in accordance with claim 3 wherein said gas generant composition contains A) both nitrogen and oxygen atoms, B) both nitrogen and hydrogen atoms or C) nitrogen, oxygen and hydrogen atoms.

6. The combination in accordance with claim 5 wherein said gas generant composition further contains carbon atoms.

7. The combination in accordance with claim 3 wherein said gas-eliminators contained within said pouch means is in an amount of between about 1 and about 100% by weight relative to said gas generant composition in said inflator.

8. An automotive airbag containing loose sheets of fabric, said fabric being impregnated with gas-eliminator for removing undesirable gases from a flow of gases through said airbag, and said fabric being disposed so as to contact gases during their flow through said airbag.

9. An airbag according to claim 8 wherein said gas-eliminator comprises material selected from the group consisting of catalytic material, absorbent material, and adsorbent material.

10. An airbag according to claim 8 in combination with an inflator containing a gas generant composition.

11. The combination according to claim 10 wherein said gas-eliminator comprises material selected from the group consisting of catalytic material, absorbent material, and absorbent material.

12. The combination in accordance with claim 10 wherein said gas generant composition contains A) both nitrogen and oxygen atoms, B) both nitrogen and hydrogen atoms or C) nitrogen, oxygen and hydrogen atoms.

13. The combination in accordance with claim 12 wherein said gas generant composition further contains carbon atoms.

14. The combination in accordance with claim 10 wherein said gas-eliminator contained within said airbag is in an amount of between about 1 and about 100% by weight relative to said gas generant composition in said inflator.

* * * * *